(12) United States Patent
Wakasugi

(10) Patent No.: US 7,203,867 B2
(45) Date of Patent: Apr. 10, 2007

(54) PROCESSOR SYSTEM, PROCESSOR AND ARITHMETIC PROCESSING METHOD

(75) Inventor: Jun Wakasugi, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 428 days.

(21) Appl. No.: 10/670,233

(22) Filed: Sep. 26, 2003

(65) Prior Publication Data
US 2004/0153829 A1 Aug. 5, 2004

(30) Foreign Application Priority Data
Sep. 30, 2002 (JP) ............................. 2002-285740

(51) Int. Cl.
*G06F 11/00* (2006.01)
(52) U.S. Cl. ..................... 714/38; 714/28; 712/227; 717/124
(58) Field of Classification Search ............ 714/28–31, 714/38; 712/227; 717/124
See application file for complete search history.

(56) References Cited

U.S. PATENT DOCUMENTS

| | | | |
|---|---|---|---|
| 5,357,627 A * | 10/1994 | Miyazawa et al. ............. | 714/6 |
| 5,592,613 A | 1/1997 | Miyazawa et al. | |
| 5,784,537 A * | 7/1998 | Suzuki et al. .................. | 714/5 |
| 5,938,774 A * | 8/1999 | Hsu ............................... | 714/6 |
| 6,023,758 A * | 2/2000 | Kodama et al. ............ | 712/220 |
| 6,209,045 B1 * | 3/2001 | Hasegawa et al. ............ | 710/15 |
| 6,335,879 B1 * | 1/2002 | Matsubara et al. ..... | 365/185.08 |

FOREIGN PATENT DOCUMENTS

| | | |
|---|---|---|
| CN | 1208194 A | 2/1999 |
| JP | 5-298462 | 11/1993 |
| JP | 8-95946 | 4/1996 |

* cited by examiner

*Primary Examiner*—Robert Beausoliel
*Assistant Examiner*—Emerson Puente
(74) *Attorney, Agent, or Firm*—Oblon, Spivak, McClelland, Maier & Neustadt, P.C.

(57) ABSTRACT

A processor system, comprising: a first program storage which stores a first program; a second program storage which stores a second program; a program counter which outputs execution addresses of said first and second programs; a first address storage which stores a first address in said first program; a second address storage which stores a second address in said second program; a comparator which compares whether or not said program counter coincides with said first address; an address changing unit which changes said program counter to said second address, when it is determined to have coincided by said comparator; and a data bus which updates said first address stored in said first address storage and said second address stored in said second address storage. A arithmetic processing method, comprising: outputting from a program counter execution addresses of a first program stored in a first program storage and a second program stored in a second program storage; determining whether or not said program counter coincides with a first address in said first program stored in said first address storage; and changing said program counter into a second address in said second program stored in said second address storage, when it is determined to have coincided.

6 Claims, 4 Drawing Sheets

000   move   ROM_ADR, #h100

001   move   BRANCH DESTINATION reg, #h010

002   SET FORCED BRANCH TO ENABLE

003   JUMP   h080

··· (OMISSION) ···

010   move   ROM_ADR, #h200

011   move   BRANCH DESTINATION reg, #h110

012   JUMP   h120

··· (OMISSION) ···

030   move   ROM_ADR, #h300

031   move   BRANCH DESTINATION reg, #h210

033   JUMP   h140

F I G. 3

PROCESSOR SYSTEM, PROCESSOR AND ARITHMETIC PROCESSING METHOD

CROSS REFERENCE TO RELATED APPLICATIONS

This application claims benefit of priority under 35USC§119 to Japanese Patent Application No. 2002-285740, filed on Sep. 30, 2002, the entire contents of which are incorporated by reference herein.

BACKGROUND OF THE INVENTION

1. Field of the Invention

The present invention relates to a processor system, a processor and a method of arithmetic processing method capable of updating and debugging at least portion of a first program stored in a first program storage.

2. Related Background Art

A one chip micro computer ordinarily contains a mask ROM. Micro codes are embedded in such kind of mask ROM at manufactured time in advance. Since the mask ROM cannot rewrite data, if the micro codes include errors, the micro computer by itself has to be exchanged. Therefore, maintainability is not good, and it takes too much cost to revise the micro codes.

In order to overcome such a problem, a processor system in which when the micro codes in the program ROM include the errors, only the erroneous portions can be updated has been realized.

Such kind of conventional processor system has a program RAM in which the correct micro codes are stored, a ROM address register in which erroneous addresses of the micro codes in the program ROM are stored, a forced branch destination PC register in which addresses to be executed in the program RAM are stored, and an address comparator for determining whether or not a program counter coincides with erroneous addresses stored in the ROM address register. The processor system changes a value of the program counter into a value of the forced branch destination PC register. Therefore, correct micro codes stored in the program RAM are executed.

When the micro codes include a plurality of errors, however, the ROM address register and the forced branch destination PC register has to be provided by each erroneous location. Therefore, circuit size becomes large.

Although such kind of conventional processor system replaces the erroneous micro codes with correct micro codes, the system does not have a function for debugging the micro codes in the program ROM. Because of this, in order to perform the debug, a debug dedicated circuit has to be added to the processor system, thereby increasing the circuit size.

SUMMARY OF THE INVENTION

A processor system according to one embodiment of the present invention, comprising:

a first program storage which stores a first program;

a second program storage which stores a second program;

a program counter which outputs execution addresses of said first and second programs;

a first address storage which stores a first address in said first program;

a second address storage which stores a second address in said second program;

a comparator which compares whether or not said program counter coincides with said first address;

an address changing unit which changes said program counter to said second address, when it is determined to have coincided by said comparator; and a data bus which updates said first address stored in said first address storage and said second address stored in said second address storage.

Furthermore, a arithmetic processing method, comprising:

outputting from a program counter execution addresses of a first program stored in a first program storage and a second program stored in a second program storage;

determining whether or not said program counter coincides with a first address in said first program stored in said first address storage; and changing said program counter into a second address in said second program stored in said second address storage, when it is determined to have coincided.

BRIEF DESCRIPTION OF THE DRAWINGS

FIG. 3 is a diagram showing one example of such kinds of instruction strings.

DESCRIPTION OF THE PREFERRED EMBODIMENTS

Hereinafter, a processor system, a processor and an arithmetic processing method according to one embodiment of the present invention will be more specifically described with reference to drawings.

Figure 1:
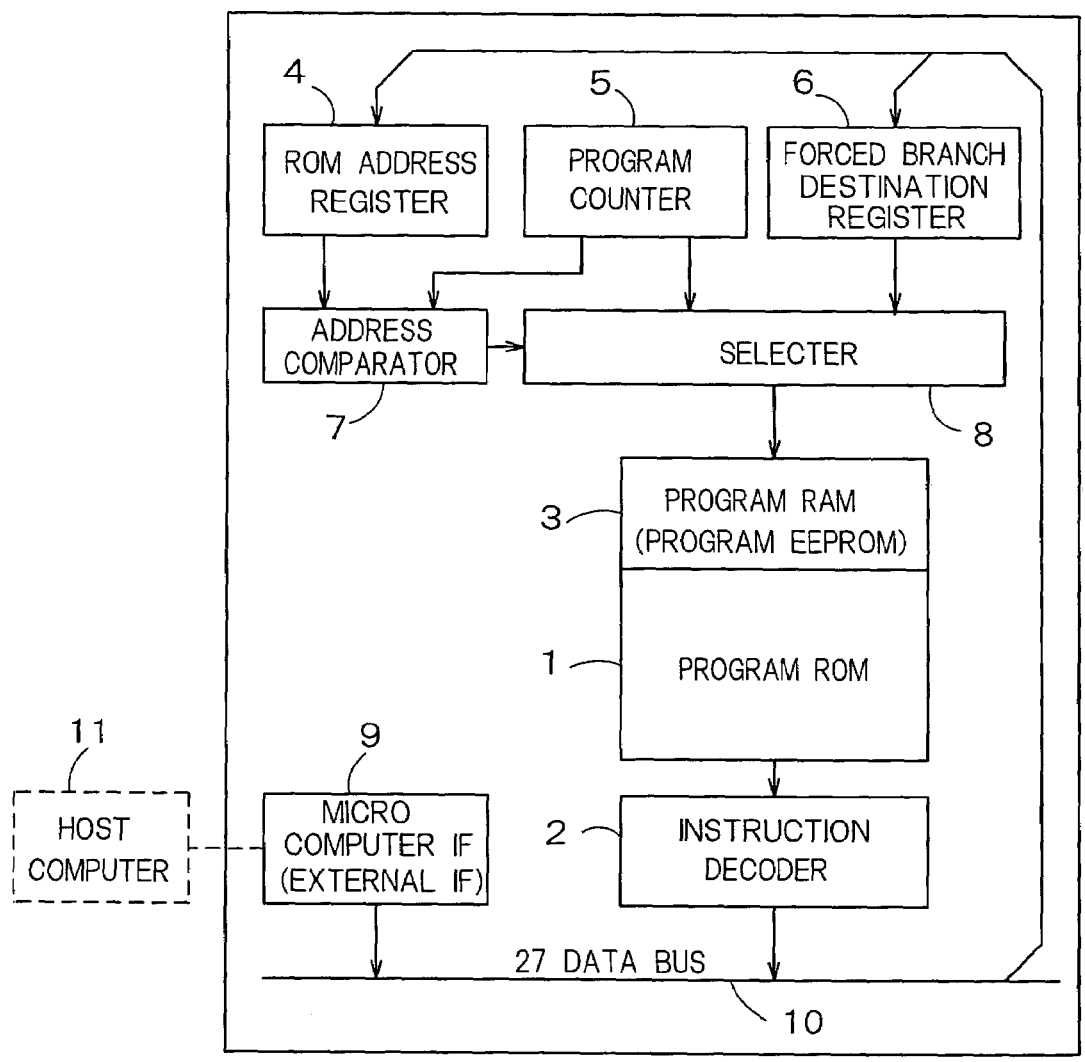
FIG. 1 is a block diagram of a processor system according to one embodiment of the present invention.

FIG. 1 is a block diagram of a processor system according to one embodiment of the present invention.

The processor system of FIG. 1 has a program ROM 1 for storing micro codes, an instruction decoder 2 for decoding instructions included in the micro codes, a program RAM 3 for storing the updated micro codes in which errors in the micro codes has been revised, an ROM address register 4 for storing addresses indicative of errors in the micro codes stored in the program RAM 1, a forced branch destination PC register 6 for storing a branch destination address when the micro codes include errors, an address comparator 7 for detecting whether the address stored in the address register 4 coincide with the program counter 5, a selector 8 for changing the program counter 5 into the branch destination address when both addresses coincide with each other, a micro computer IF unit 9 (an external IF unit) for transferring data for outside.

In the processor system of FIG. 1, the instruction decoder 2, the ROM address register 4, the forced branch destination register 6 and the micro computer IF unit 6 are connected to a common data bus 10.

All the constituents of FIG. 1 may be contained in the one chip IC. Or a chip for the processor may be provided separate from a chip for a peripheral memory. In the case of providing separate chips, the processor has, for example, the instruction decoder 2 of FIG. 1, the ROM address register 4, the program counter 5, the forced branch destination register 6, the address comparator 7, the selector 8 and the micro computer IF 9.

Figure 2:
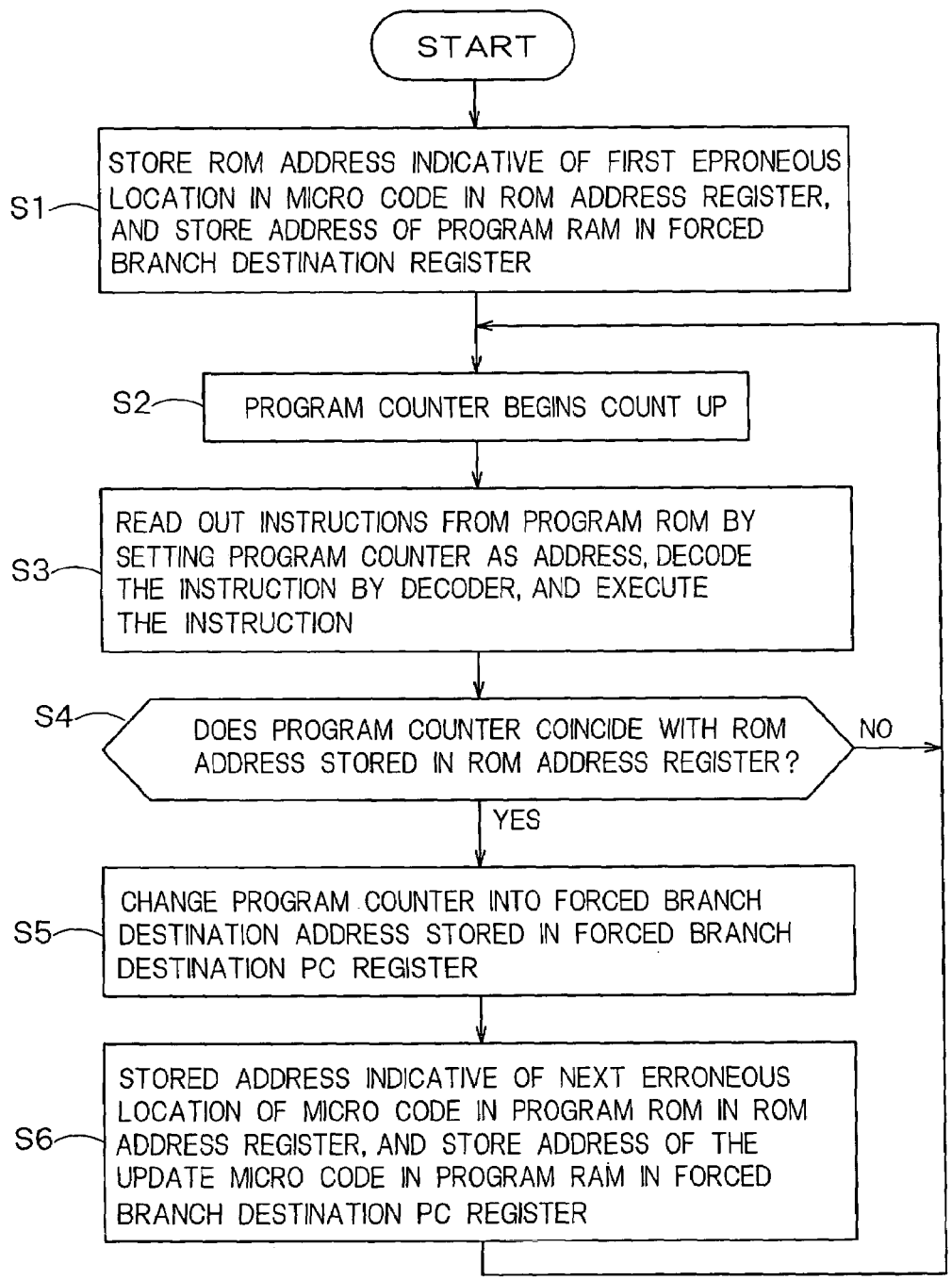
FIG. 2 is a flowchart showing processing operations of a processor system of FIG. 1.

FIG. 2 is a flowchart showing processing operations of the processor system of FIG. 1. Hereinafter, the processing operations of this embodiment will be described with reference to FIGS. 1 and 2. It is assumed that the micro codes in the program ROM 1 include a plurality of errors.

First of all, the ROM address indicative of an error location at first time is stored in the ROM address register 4 from outside via the micro computer IF unit and a data bus 10. Similarly, the address of the program RAM 3 in which the updated micro codes are stored is stored in the forced branch destination PC register from outside via the micro computer IF unit 9 and the data bus 10 (step S1).

Afterward, the program counter 5 begins count-up operation (step S2). Instructions are read out from the program ROM 1 by setting the program counter 5 as an address, the instruction is decoded by the instruction decoder 2, and the instruction is executed (step S3).

In parallel with the processing, the address comparator 7 detects whether or not the program counter 5 coincides with the ROM address stored in the ROM address register 4 (step S4). If not coincided, the processings of steps S2 and S3 are repeated.

If coincided, the selector 8 changes the program counter 5 into the forced branch destination address stored in the forced branch destination PC register 6 (step S5).

The forced branch destination address indicates the updated micro codes in the program RAM 3. Therefore, instead of the erroneous micro codes in the program ROM 1, the updated micro codes in the program RAM 3 are executed.

The ROM address register 4 stores the address indicative of a next erroneous location of the micro codes in the program ROM 1. Similarly, the addresses of the updated micro codes in the program RAM 3 are stored in the forced branch destination PC register (S6). Subsequently, the processings of steps S2–S6 are repeated.

As a method of storing the addresses in the ROM address register 4 or the forced branch destination PC register in the above steps S1 and S6, there are a method of storing the address supplied from outside as mentioned above in the registers via the micro computer IF and the database 10, and a method of storing the addresses in the registers based on the program in the program RAM 3.

In the case of the latter, for example, the instructions for storing the addresses of the ROM address register 4 and the forced branch destination PC register 6 are described in the program of the program RAM 3.

FIG. 3 is a diagram showing one example of such kind of instruction strings. In the example of FIG. 3, first of all, when the program counter 5 is "000", the address "100" is stored in the ROM address register 4. When the program counter 5 becomes "001", the address "10" is stored in the forced branch destination PC register 6. When the program counter 5 becomes "002", the forced branch is allowed. When the program counter 5 becomes "003", the program counter 6 branches to the address "80" to execute the updated program.

Afterward, when the program counter 5 becomes "010", a next erroneous location is stored in the ROM register, and when the program counter 5 becomes "011", the forced branch destination PC register 6 is stored. Subsequently, even when the program counter 5 has become "030", the same processings are performed.

As described above, according to the present embodiment, a plurality of addresses can be repeatedly stored via the data bus 10 in the ROM address register 4 and the forced branch destination PC register 6. Because of this, even if the micro codes in the program ROM 1 include a plurality of errors, it is possible to execute the updated micro codes corresponding to the errors, without increasing the circuit size, thereby improving maintainability of the program.

The processor system of FIG. 1 can be used even to the debug of the program ROM 1. In this case, as shown in a dotted line of FIG. 1, the debug is carried out by the instruction of the host computer connected to the micro computer IF. There are a method of performing the debug while breaking the program as many as the address locations designated in the ROM 1, and a method of executing the program in the program ROM 1 by each step.

In the case of the former, the debug program is stored from the host computer 1, via the micro computer IF, into the program RAM 3 (step S11). Subsequently, a head address for performing the debug of the program ROM 1 is stored from the host computer 11, via the micro computer IF, into the ROM address register 4. Similarly, the branch destination address at debug time (in this case, the head address of the debug program in the program RAM 3) is stored in the forced branch destination PC register 6 (step S12).

Subsequently, execution of the program in the program ROM 1 is begun (step S13). When the program counter 5 coincides with the value of the ROM address register 4, the debug program in the program RAM 3 is executed based on the value of the forced branch destination PC register 6 (step S14).

In the debug program, for example, the processing for transferring the value of an arbitrary memory and register via the micro computer IF, to the host computer 11 is carried out. Therefore, it is possible to perform the debug with regard to an arbitrary address range in the program ROM 1 (step S15). In the debug program, it is possible to store a new value in the ROM address register 4 and the forced branch destination PC register 6, and to continuously perform the debug with regard to a plurality of locations in the program ROM 1.

Figure 4:
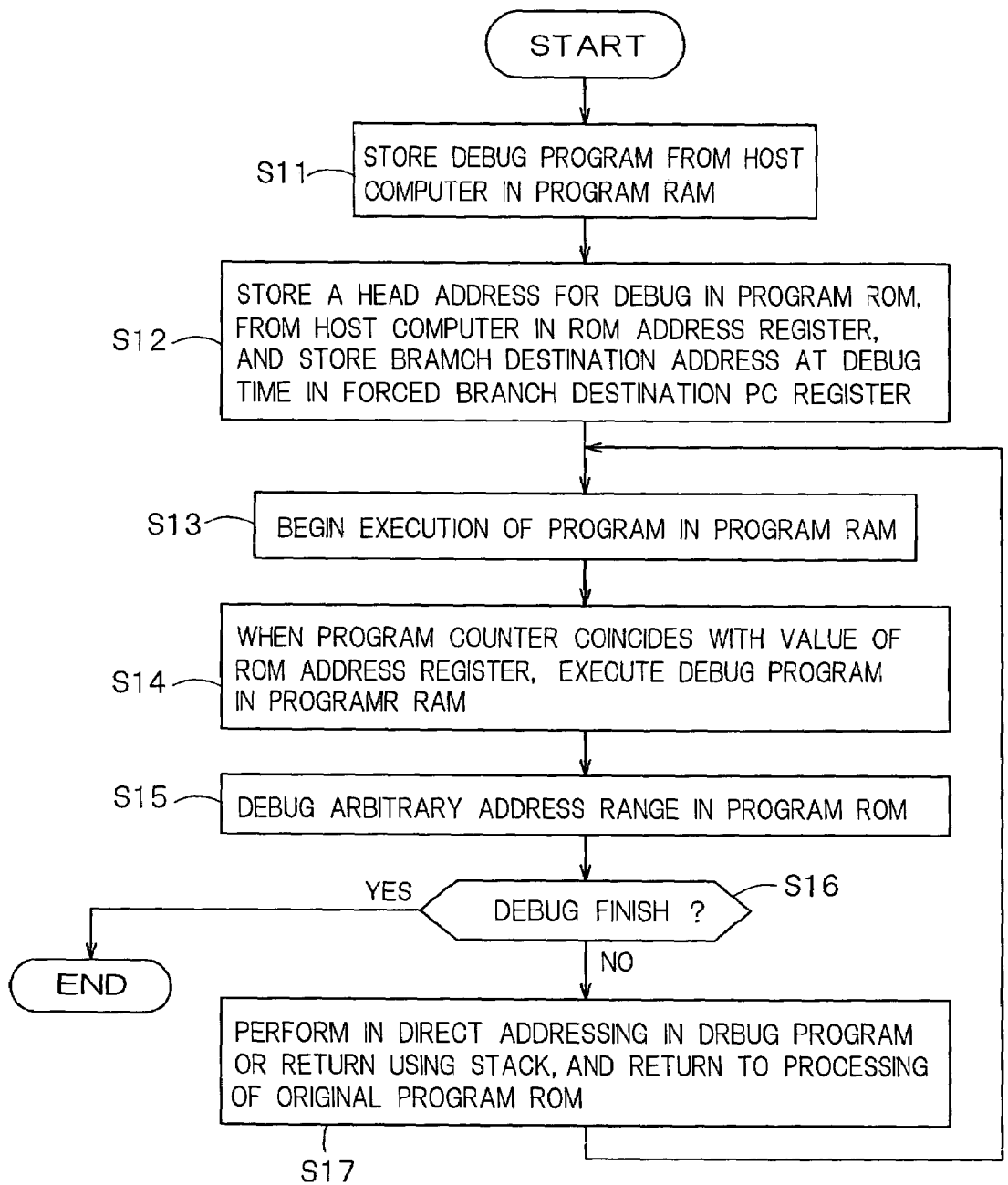
FIG. 4 is a flowchart showing processing procedure in the case of debugging.

Next, it is determined whether or not the debug processings are finished (step S16). If determined to be finished, the processings of FIG. 4 are ended. If determined not to be finished, indirect addressing or return using stack is performed in the debug program, in order to return to the processings of the original program ROM 1 (step S17). Hereinafter, the processings of steps S13–S16 are repeated.

When the program in the program ROM 1 is executed by each step, the processing procedures of steps S11–S14 are the same. After the execution of the debug program is begun in step S14, the ROM address register 4 is incremented in the debug program. Next, the processings after steps S13 are repeated.

As described above, according to this embodiment, even if a dedicated hardware for debug is not provided, it is possible to perform debug of the program in the ROM 1. Because of this, it is possible to make easy development of the program.

What is claimed is:

1. A processor system, comprising:
a first program storage which stores a first program;
a second program storage which stores a second program;
a program counter which outputs execution addresses of said first and second programs;
a first address storage which stores a first address in said first program;
a second address storage which stores a second address in said second program;
a comparator which compares whether or not said program counter coincides with said first address;

an address changing unit which changes said program counter to said second address, when it is determined to have coincided by said comparator;

a data bus which updates said first address stored in said first address storage and said second address stored in said second address storage; and an instruction decoder which provides a result of decoding instructions read out from said first and second program storages to said data bus, wherein said first address stored in said first address storage and said second address stored in said second address storage are updated based on the result of said instruction decoder.

2. The processor system according to claim 1, wherein said first program includes:

a plurality of instructions which store a plurality of first addresses in said first address storage; and a plurality of instructions which store a plurality of second addresses in said second address storage, wherein said first address storage stores a plurality of first addresses in sequence, in accordance with said first program at timing different from each other; and said second address storage stores a plurality of second addresses in sequence, in accordance with said first program at timing different from each other.

3. A processor, comprising:

a program counter which outputs execution addresses of a first program stored in a first program storage and a second program stored in a second program storage;

a comparator which determines whether or not said program counter coincides with a first address in said first program stored in said first address storage;

an address changing unit which changes said program counter to a second address in said second program stored in said second address storage, when it is determined to have coincided by said comparator;

a data bus which updates said first address stored in said first address storage and said second address stored in said second address storage; and an instruction decoder which supplies a result of decoding instructions read out from said first and second program to said data bus, wherein said first address stored in said first address storage and said second address stored in said second address storage are updated based on the result of said instruction decoder.

4. The processor according to claim 3, wherein said first program includes:

a plurality of instructions which store a plurality of first addresses in said first address storage; and a plurality of instructions which store a plurality of second addresses in said second address storage, the processor according to claim 3, further comprising:

a first address storing controller which performs control for storing in sequence a plurality of first addresses in said first address storage at timing different from each other, in accordance with said first program; and a second address storing controller which performs control for storing in sequence a plurality of second addresses in said second address storage at timing different from each other, in accordance with said first program.

5. An arithmetic processing method, comprising:

outputting from a program counter execution addresses of a first program stored in a first program storage and a second program stored in a second program storage;

determining whether or not said program counter coincides with a first address in said first program stored in said first address storage;

changing said program counter into a second address in said second program stored in said second address storage, when it is determined to have coincided; and supplying a result of decoding instructions read out from said first and second program storages to said data bus, wherein said first address stored in said first address storage and said second address stored in said second address storage are updated based on the result of said supplying.

6. The arithmetic processing method according to claim 5, wherein said first program includes:

a plurality of instructions which store a plurality of first addresses in said first address storage; and a plurality of instructions which store a plurality of second addresses in said second address storage, and further comprising:

performing control for storing in sequence a plurality of first addresses in said first address storage at timing different from each other, in accordance with said first program; and performing control for storing in sequence a plurality of second addresses in said second address storage at timing different from each other, in accordance with said first program.

* * * * *